Sept. 23, 1969    J. H. GRAY    3,467,991
COTTON CLEANER

Original Filed March 15, 1965    2 Sheets-Sheet 1

INVENTOR.
JAMES H. GRAY
BY
McLaughlin, Cahill & Drummond
ATTORNEYS

INVENTOR.
JAMES H. GRAY

ATTORNEYS

United States Patent Office 3,467,991
Patented Sept. 23, 1969

3,467,991
COTTON CLEANER
James H. Gray, Phoenix, Ariz., assignor to William E. Rood, Jr., Phoenix, Ariz.
Continuation of application Ser. No. 439,544, Mar. 15, 1965. This application July 28, 1967, Ser. No. 660,160
Int. Cl. D01b 1/08
U.S. Cl. 19—203                    5 Claims

ABSTRACT OF THE DISCLOSURE

A pair of rotating drum saws mounted adjacent each other having their respective surfaces at a point opposite each other moving in the same tangential direction; the surface speed of one saw exceeds that of the other to permit cotton to be snagged and carried upwardly into the cleaner. The cotton feed area adjacent the space between the two drum saws is angled and is unobstructed to permit sticks to be rolled between the saws and be thrown tangentially upwardly away from the saws without breaking the sticks.

---

This application is a continuation of application Ser. No. 439,544, filed Mar. 15, 1965, now abandoned.

The present invention pertains to cotton cleaners, and more specifically to apparatus for removing debris and trash from cotton.

Modern cotton retrieving techniques, including ground-retrieving, have necessitated the utilization of extensive cleaning techniques to insure reasonably clean cotton prior to delivery of the cotton to the gin. Since ground-retrieved cotton is likely to carry with it large limbs and other debris, it has been found that prior art techniques magnify rather than alleviate cleaning problems. Prior art cotton cleaners break or chop large limbs and other brittle debris prior to attempting to remove the debris from the cotton. The small pieces of debris and bark resulting from the chopping become difficult to separate since the smaller pieces adhere and cling to the cotton. Prior art machinery and apparatus utilized to clean ground-retrieved cotton, also have the disadvantage of being complicated and are inefficient because of inefficient use of the elements of the machine.

It is therefore an object of the present invention to provide a cotton cleaner utilizing a principle that provides a more efficient use of the elements of the cotton cleaner.

It is also an object of the present invention to provide a cotton cleaner that removes sticks and trash from cotton without breaking or chopping larger sticks or debris prior to their removal.

It is also an object of the present invention to provide a cotton cleaner that effectively removes trash and debris from ground-retrieved cotton and automatically reclaims cotton that adheres to the debris that has been thrown out by the machine of the present invention.

Briefly, in accordance with one embodiment of the present invention, a cotton cleaner is provided having a rotating saw that snags cotton tufts and carries the tufts around and upwardly on the saw teeth. The saw initially engages the cotton in such a manner that sticks and trash are forced in a tangential direction out of contact with the saw surface to ultimately be discarded. The invention is particularly useful in the instance of large sticks which are merely fed through the cotton snagging saw and are rolled tangentially out of contact with the saw and thrown clear of the cotton being carried by the saw. The present invention may more readily be described by reference to the accompanying drawings in which:

Figure 1:
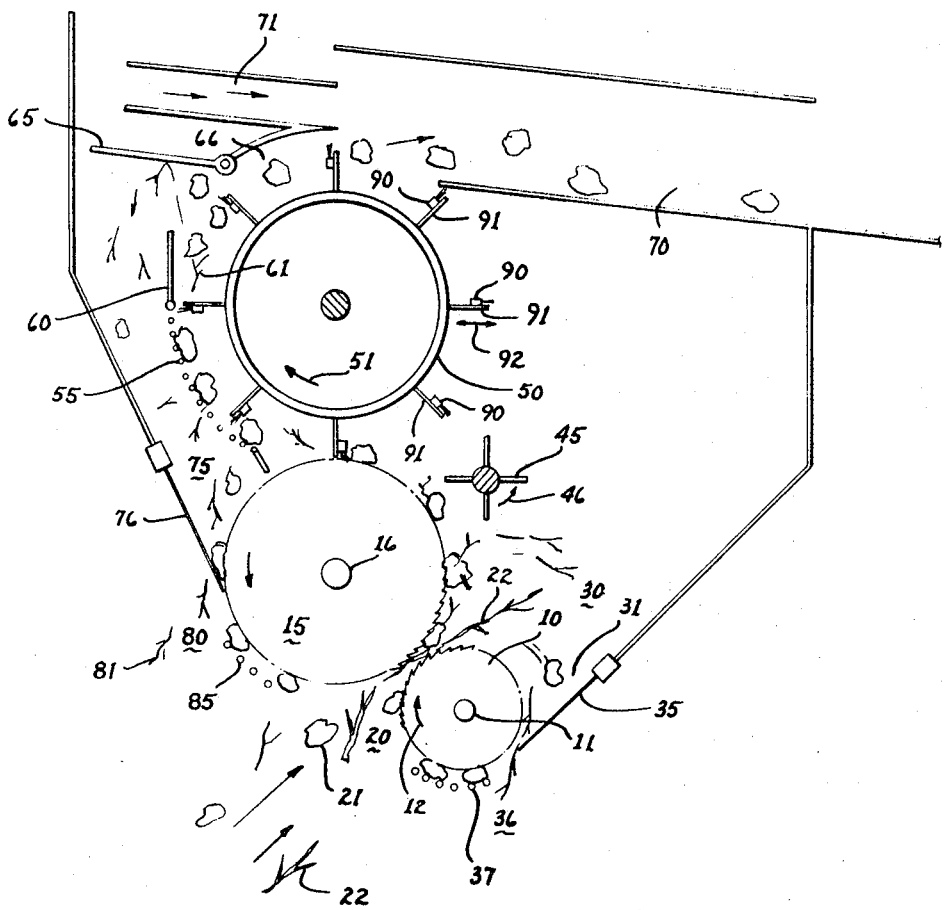
FIGURE 1 is a side elevational view of a cotton cleaning machine constructed in accordance with the teachings of the present invention.

Referring to FIGURE 1, a first plurality of saws 10 mounted coaxially on a shaft 11 are rotated in the direction indicated by the arrow 12. The saw teeth are arranged as shown to snag cotton as the saws rotate. A second plurality of saws 15 are mounted coaxially on a shaft 16 and are rotated in the direction indicated by the arrow 17. The first and second pluralities of saws 10 and 15 are positioned relative to each other to define a feed space 20 therebetween.

In some instances, it may be desirable to replace the first plurality of saws 10 with a rotating drum devoid of saw teeth. The surface of the drum may be rubberized to assist the saws 15 to snag cotton. The first plurality of saws 10 may also be replaced with brushes, the sides of the bristles of which are urged against the periphery of the saws 15. Many variations may be used to provide a cotton supporting surface to facilitate the snagging of the cotton by the saws 15 and to enable the saws 15 to force sticks and debris tangentially away from the saws 15. The use of the first plurality of saws 10 appears to be the most feasible embodiment and is thus the embodiment chosen for illustration.

Figure 5:
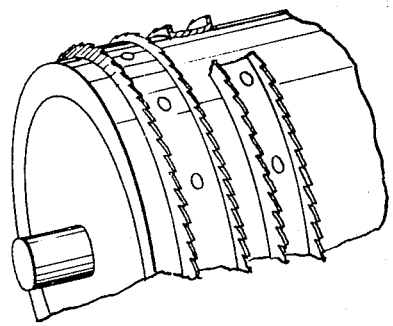
FIGURE 5 is an isometric view of a plurality of saws of the type used in the embodiment shown in FIGURE 1.

The peripheral velocity of the two pluralities of saws are in the same direction at the feed space and the second plurality of saws are rotated at a peripheral velocity of approximately twice that of the peripheral velocity of the first plurality of saws. An isometric view of a typical saw design, suitable for use in the embodiment of FIGURE 1, is shown in FIGURE 5. Cotton 21 in the area of the feed space 20, and debris such as sticks 22, are fed into the feed space where the cotton is snagged by the faster-moving second plurality of saws. Larger sticks and trash, adhering to the cotton, are thrown outwardly from the feed space and fall back into a reclaiming space 30. Cotton, having been snagged by the second plurality of saws 15, is carried upwardly away from the trash. Sticks 22 that fall into the reclaiming space 30 fall by gravity to the area 31 together with any cotton that might have been thrown clear with the sticks. An adjustable brush 35 is positioned adjacent to the first plurality of saws and is approximately tangential thereto. The brush is adjusted to exert a gentle pressure on the trash, sticks, and cotton in the area 31 against the saws 10. The brush 35 may be constructed using steel wire, nylon, etc.; the brush may also be constructed without bristles (e.g., a thin sheet of material oriented in the direction that bristles would normally be oriented). A trash ejection area 36 permits sticks and trash to be thrown clear of the cotton cleaning apparatus while the cotton, snagged on the saws 10, is carried past a plurality of grid bars 37 back to the feed space 20. It may be noted that there are no grid bars to hold cotton against saws 15 as the cotton is carried upward and away from the feed space 20. Positioning of the saws 15 so that the cotton is carried by the saw teeth without the necessity of grid bars presents a unique approach to cotton cleaning which permits the removal of large stalks and sticks. In prior art cleaners, grid bars are placed adjacent the saws to hold cotton against the saw and thus prevents large sticks from being removed from the cotton without first being chopped to enable the smaller pieces to pass between the grid bars; however, the smaller pieces then become mixed with the cotton and are considerably more difficult to remove. The unique arrangement of the present invention actually rolls or feeds large sticks from the feed space 20 into the reclaiming space 30 where the sticks, still intact, are rolled or fed out of the cleaner by the combined action of the lower saws 10 and brush 35. Since the saws 15 are moving upward from the feed space, the cotton is carried upward away from trash such as large sticks, the latter tending to remain moving in a straight line as they pass between the saws 10 and 15. It may also be noted that when the sticks have passed from between the saws 10 and 15, and fall into the reclaiming area 30, they are directionally oriented to facilitate their removal through the trash ejection area.

In those instances where a drum, brushes, or other suitable surface, is used in lieu of the saw 10, the action of the saw 15 is the same and trash, such as large sticks, are fed past the saw 15 into the trash ejection area.

A trash doffer 45, rotating in the direction indicated by the arrow 46, is positioned adjacent the plurality of saws 15 and is spaced slightly from the periphery thereof (approximately 1 inch) to strike small sticks and debris from cotton snagged on the saws 15, thereby knocking adhering debris therefrom. A doffer 50, rotating in the direction indicated by the arrow 51 at a peripheral velocity greater than that of the saws 15 (approximately 3 times the peripheral velocity has been found to operate well), knocks the cotton from the saws 15 and carries the cotton and adhering trash around the periphery thereof. The cotton and trash are held against the doffer by a plurality of grid bars 55 positioned about the doffer and radially spaced therefrom. A brush 60 is mounted adjacent the doffer 50 and includes bristles (if bristles are used) extending approximately tangential thereto. The brush 60 is relatively flexible and may be forced radially outwardly of the doffer 50 when sufficient force is exerted thereagainst by sticks and trash such as the stick 61. An adjustable angle-plate 65 is placed above the brush 60 and is adjusted to permit cotton and trash to be thrown thereagainst by the doffer 50. A passage 66 holds cotton carried by the doffer against the periphery of the doffer until the cotton approaches the air duct 70 where it is withdrawn into the air duct by a jet of air from an air-blower outlet 71.

A reclaiming space 75 is provided with a brush 76 positioned adjacent the saws 15. The brush may be adjusted to exert gentle pressure on cotton and trash to force them against the periphery of the saws 15. The reclaiming space 75 includes a trash ejection area 80 to permit trash such as sticks 81 to be thrown from the cleaning apparatus of the present invention. Grid bars 85 are positioned adjacent to and radially spaced from the saws 15 to maintain contact between cotton snagged by the saws in the reclaiming space 75 as the cotton travels back to the feed space 20.

The doffer 50 includes adjustable brushes 90 mounted on the trailing sides of the radial doffer plates 91. The brushes 90 are adjustable radially of the doffer as indicated by the arrow 92. The doffer 50, constructed in the manner shown permits the doffer plates to first strike cotton and debris from the saws 15 and then clean the saws immediately thereafter with the brushes 90. Since the brushes are adjustable, they may be positioned to obtain maximum cleaning of the saw and may be positioned to compensate for wear of the bristles. The brushes, as shown in FIGURE 1, are positioned to extend radially beyond the ends of the doffer plates.

The operation of the embodiment shown in FIGURE 1 may be described as follows. Cotton 21 and trash such as sticks 22 are supplied to the cotton cleaner of the present invention at the feed space 20. The saws 15 and 10 grasp the material in the feed space and pull it into the area between the saws. Since the saws 15 are traveling at a greater peripheral velocity than the saws 10, the cotton is snagged on the periphery of the saws 15 and carried out of the feed space upwardly and away from the reclaim space 30. Debris, such as large sticks, are not snagged by the teeth of the saws and therefore are rolled into the reclaiming space 30 and fall by gravity back into the area 31. Some cotton will also be thrown into this area and the cotton, sticks and debris fall from the area 31 against a brush 35. The wire 35 gently urges the material in the area 31 against the saws 10. The force exerted by the wire 35 is sufficient to insure that cotton in the area 31 is snagged by the teeth of the saws 10; however, the force is insufficient to cause sticks to be broken, chopped, or otherwise snagged by the teeth of the saws. The larger sticks (it is the larger sticks that cause the most difficulty in prior art devices since the sticks are chopped and thus become small particles difficult to remove from the cotton) are ejected at the trash-ejection area 36. Cotton that is snagged by the saws 10 from the area 31 is carried around underneath the saw and are held against the periphery thereof by the grid bars 37. The cotton from the area 31 is thus fed back into the feed space 20 where it is snagged by the faster peripheral velocity of the saws 15.

Cotton carried by the saws 15 is carried upwardly toward the trash doffer 45. The doffer, rotating at a relatively high velocity, knocks debris and smaller sticks, adhering to the cotton, therefrom back into the reclaim space 30 where the trash is ejected as described previously and where any cotton that might have been knocked off the saws 15 by the trash doffer 45 is also reclaimed by the saws 10. The cotton thus travels upwardly from the trash doffer 45 to the area of the doffer 50. The doffer 50, rotating as described previously at a greater peripheral velocity than the saws 15, knocks the cotton from the saws and carries the cotton around the periphery of the doffer. The grid bars 55 maintain the cotton against the doffer and also provide an additional means for dislodging trash adhering to the cotton by permitting the trash to be thrown between the grid bars. As the cotton, and whatever debris and sticks may be adhering thereto, are carried around the periphery of the doffer, the material reaches the area of the brush 60. Sticks and other such debris are thrown by the centrifugal force imparted thereto by the doffer 50 against the brush. The brush flexes under the strain of the centrifugal force and permits the trash and sticks such as stick 61 to fly upwardly and radially outwardly of the doffer 50 against the angle-plate 65. Cotton, being very light, does not have sufficient weight to cause the brush to flex and is therefore directed upwardly against the angle-plate 65 and strikes the plate at a different location than the trash and sticks. Sticks and other rigid trash readily bounce when thrown against the angle-plate and, with the angle-plate properly adjusted as indicated in FIGURE 1, the sticks rebound away from the doffer back to the reclaiming space 75; whereas, cotton, not readily bouncing, merely falls back onto the doffer and is carried by the doffer through the passageway 66 into the air duct 70. The sticks thrown against the angle-plate 65 and falling into the reclaiming space, together with any cotton that may follow the sticks after striking the angle-plate or cotton that may fall between the grid bars 55, are subjected to the same reclaiming action that the material in area 31 was subjected to. Brush 76 gently urges the material into contact with the periphery of the saws 15 where the cotton is snagged and carried about the periphery of the saws (contact with the saws being insured by the grid bars 55) back to the feed space 20. The rigid material such as sticks 81, being unable to be snagged by the saws 15, are ejected at the trash-ejection area 80. Any cotton that is not removed from the doffer into the air duct 70 will follow the doffer and be thrown into the reclaiming space 30 where the reclaiming action described above takes place.

Large limbs or sticks remain in a single piece and are readily thrown from the cleaning apparatus without breakage, without chopping, and without the necessity of removing the small pieces remaining if such chopping were to take place. The entire periphery of both pluralities of saws are used to clean and reclaim cotton thus obtaining the maximum efficiency obtainable from a circular saw arrangement. The doffer 50 is used throughout the entire periphery of its surface by transporting and cleaning cotton, and providing a downdraft to aid in directing material to the reclaiming area 30. The doffer 50 also provides the centrifugal force necessary to implement the separation of the trash by "bouncing" the trash off the angleplate.

Figure 2:
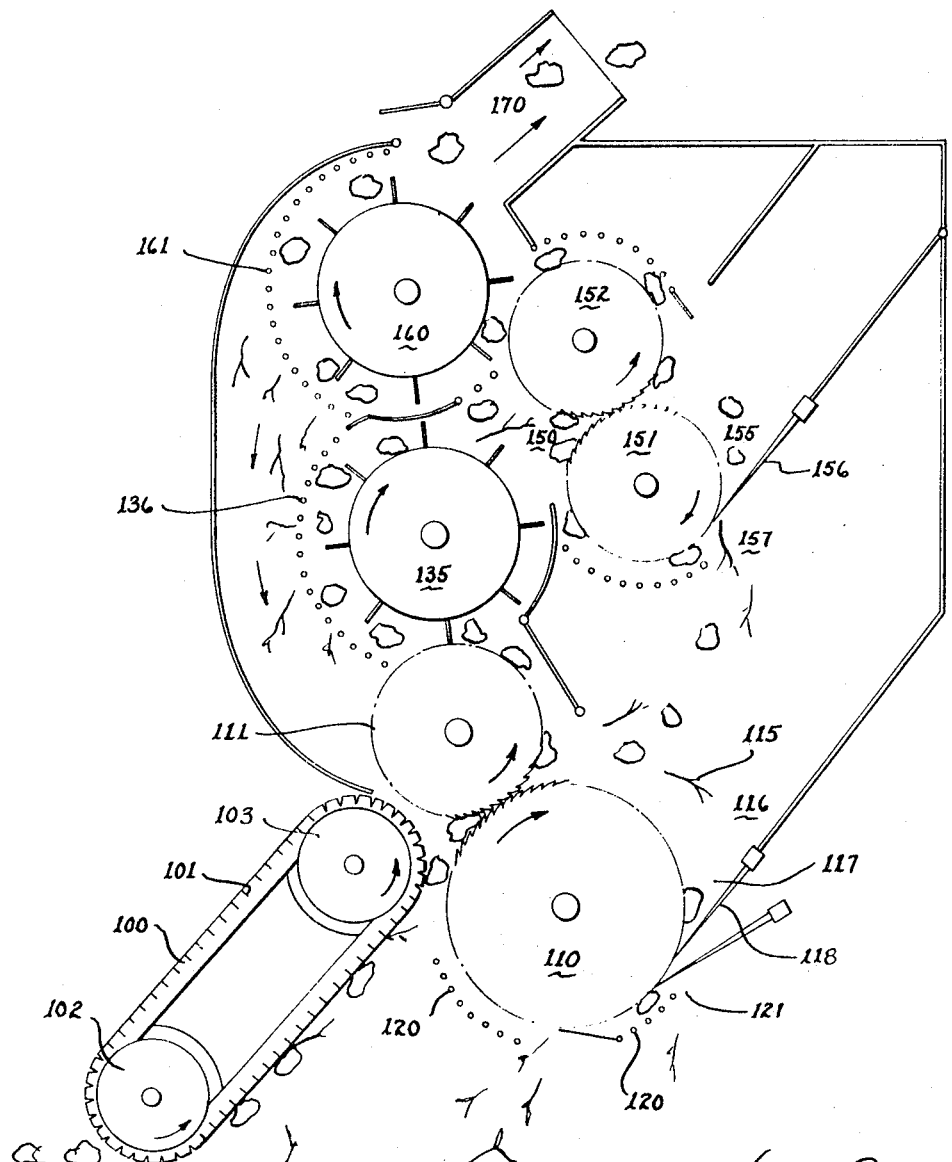
FIGURE 2 is a modification of the cotton cleaning apparatus of FIGURE 1 showing the use of the concept of the present invention in a portable cotton-retrieving device.

Referring to FIGURE 2, a modification of the present invention is shown wherein the present invention is implemented by use of a portable machine adapted to be used in connection with ground-retrieving apparatus. A flexible belt 100 having slots 101 therein, is mounted over a pair of pulleys 102 and 103 and is of the type described and claimed in Patent No. 2,670,584. As the cotton is grasped at the ground and transported upwardly by the belt 100, sticks and trash adhering to the cotton and grasped by the belt are also carried therewith. The cotton cleaner feed area 105 is positioned at a location corresponding to the location that the belt 100 releases material grasped thereby. A first plurality of saws 110 is positioned at the bottom of the cleaner and is adjacent to a second plurality of saws 111, each of said pluralities rotating in the same peripheral direction at the feed space 105. The upper plurality of saws 111 is rotating at a greater peripheral velocity than the lower plurality of saws 110. Cotton and debris such as sticks pass between the pluralities of saws in a manner described in connection with FIGURE 1 thus rolling sticks 115 into a reclaiming area 116 which then fall by gravity back to an area 117. A pair of flexible brushes 118 gently urge sticks and cotton from the area 117 into contact with the periphery of the saws 110. The cotton, being snagged by the saws, is carried around underneath the saw (maintained in contact therewith through the utilization of grid bars 120) while sticks and debris are ejected at the trash-ejection area 121. It may be noted that even though the initial portion of a large stick contacting the saw 110 may be snagged thereby, the force exerted by the brushes causes the stick to "pry" loose from the teeth of the saw as the latter portion of the stick is contacted by the brush (since sticks are not flexible, they tend to remain in a straight line and the brush insures that the stick will assume a generally tangential relationship to the surface of the saw). The cotton that falls into the reclaiming area 116 is thus transported back to the feed area 105.

Cotton snagged by the saws 111 is carried upwardly and is removed from the saws by a doffer 135. The doffer 135 cleans the cotton with the aid of grid bars 136 and also transports the cotton to a second feed area 150. The process is then repeated through the utilization of saws 151 and 152 which perform the same operations described in connection with saws 110 and 111. The sticks passing between the saws 151 and 152 are thrown into a reclaiming area 155 along with cotton that may accompany the sticks and are subsequently reclaimed by the action of the brush 156 and the saws 151. It will be noted that in the embodiment shown in FIGURE 2, the trash-ejection area 157 actually ejects the trash, and miscellaneous cotton, into the reclaiming area 116 to thereby provide a double reclaiming action on trash and debris to insure the reclaiming of any cotton adhering to the sticks or trash.

Cotton adhering to the plurality of saws 152 travels upwardly and around the saws and is removed therefrom by doffer 160 which then transports the cotton, and cleans the cotton in combination with the grid bars 161, to an air duct 170 that removes the cleaned cotton. The velocities of the upper pluralities of saws 111 and 152 in relation to the peripheral velocities of the lower pluralities of saws 110 and 151 are adjusted in accordance with the principles of the invention as described in connection with FIGURE 1. A relative peripheral velocity of 2 to 2 has been found to be most advantageous; however, variations in relative velocity may be made to adjust to individual conditions.

Figures 3, 4:
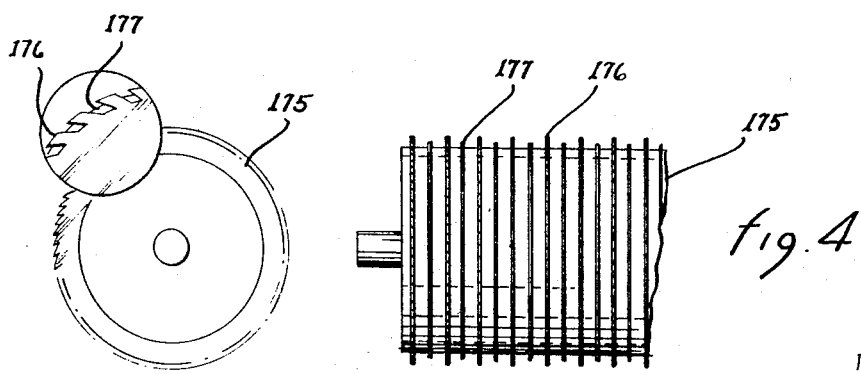
FIGURE 3 is an enlarged view of a portion of the apparatus of FIGURE 2.
FIGURE 4 is a side elevational view of the apparatus shown in FIGURE 3.

Referring to FIGURES 3 and 4, the pluralities of saws 110 and 151 of FIGURE 2 are shown in an enlarged scale. It may be seen that the modification of FIGURE 2 has utilized saws comprising a drum 175 having a plurality of circumferential columns of saw teeth 176 spaced axially along the drum. Each of the columns of saw teeth is separated from adjacent columns of saw teeth by separating rims 177 which extend radially from the drum to a height just short of the tips of the saws. Thus, when the brushes are mounted adjacent their respective saws, the gentle urging force exerted by the respective brushes on cotton, trash and sticks, will result in the snagging of the cotton by the saw teeth 176 while the separating rims 177 will aid the saws in their selectivity between cotton and trash such as sticks. The rims 177 will prevent sticks and other such debris from being forced into the interstices between the saws and will prevent sticks from lodging transversely of the drum 175 between saw teeth thereby increasing the selectivity efficiency of the respective saws.

It may therefore be seen that the cotton cleaner of the present invention obviates the difficulties previously encountered by prior art devices wherein large sticks and such debris were crushed or chopped into smaller bits thereby compounding the difficulties of removing the debris from the cotton. It may also be seen that the elements of the combination of the present invention are each utilized to the maximum extent possible to thereby increase the efficiency and obtain a maximum of cleaning and reclaiming action with a minimum number of moving parts. It has been found that cleaners constructed in accordance with the teachings of this invention have provided cleaning action comparable to prior art devices costing several times as much and including several times as many moving parts while the prior art devices are nonetheless less reliable. It will be obvious to those skilled in the art that many modifications may be made in the present invention without departing from the spirit and scope thereof; accordingly, it is intended that the present invention be limited only by the scope of the claims appended hereto.

Having now fully described my invention and the preferred embodiments thereof, I claim:

1. A cotton cleaner comprising:
    (a) a first plurality of saws mounted for rotation about a first axis,
    (b) a second plurality of saws mounted for rotation about a second axis,
    (c) said first and second axes positioned relative to each other to define a feed space between said first and second plurality of saws for admitting cotton to be cleaned, said feed space providing unobstructed access to said plurality of saws for sticks and trash carried by cotton to be cleaned, and so that a tangent to any saw at the feed space is inclined from vertical,
    (d) said first and second plurality of saws rotating about their respective axes, the peripheral velocity of said first plurality of saws being less than and in the same direction as the peripheral velocity of said second plurality of saws at said feed space to enable said second plurality of saws to carry cotton upwardly away from said feed space and to roll sticks in said feed space between said saws and out of contact with said cotton,
    (e) a doffer positioned adjacent said second plurality of saws, and mounted for rotation, at a greater velocity than and in the same direction as the peripheral velocity of the adjacent second plurality of saws, for removing cotton and trash from said second plurality of saws, and (f) an angle-plate positioned adjacent said doffer for deflecting trash thrown thereagainst from said doffer away from said doffer.

2. A cotton cleaner comprising:
(a) a first plurality of saws mounted for rotation about a first axis,
(b) a second plurality of saws mounted for rotation about a second axis,
(c) said first and second axes positioned relative to each other to define a feed space between said first and second plurality of saws for admitting cotton to be cleaned, said feed space providing unobstructed access to said plurality of saws for sticks and trash carried by cotton to be cleaned, and so that a tangent to any saw at the feed space is inclined from vertical,
(d) said first and second plurality of saws rotating about their respective axes, the peripheral velocity of said first plurality of saws being less than and in the same direction as the peripheral velocity of said second plurality of saws at said feed space to enable said second plurality of saws to carry cotton upwardly away from said feed space and to roll sticks in said feed space between said saws and out of contact with said cotton,
(e) a doffer positioned adjacent said second plurality of saws, and mounted for rotation, at a greater velocity than and in the same direction as the peripheral velocity of the adjacent second plurality of saws, for removing cotton and trash from said second plurality of saws, and
(f) an angle-plate positioned adjacent said doffer for reflecting trash thrown thereagainst from said doffer away from said doffer and for deflecting cotton thrown thereagainst from said doffer back against said doffer.

3. The apparatus set forth in claim 2, including: a flexible brush, mounted adjacent said doffer, extending approximately tangentially of said doffer for flexing when trash is thrown thereagainst by said doffer and not flexing when cotton is thrown thereagainst by said doffer.

4. A cotton cleaner comprising:
(a) a first plurality of saws mounted for rotation about a first axis,
(b) a second plurality of saws mounted for rotation about a second axis,
(c) said first and second axes positioned relative to each other to define a feed space between said first and second plurality of saws for admitting cotton to be cleaned, said feed space providing unobstructed access to said plurality of saws for sticks and trash carried by cotton to be cleaned, and so that a tangent to any saw at the feed space is inclined from vertical,
(d) said first and second plurality of saws rotating about their respective axes, the peripheral velocity of said first plurality of saws being less than and in the same direction as the peripheral velocity of said second plurality of saws at said feed space to enable said second plurality of saws to carry cotton upwardly away from said feed space and to roll sticks in said feed space between said saws and out of contact with said cotton,
(e) a doffer positioned adjacent said second plurality of saws, and mounted for rotation, at a greater velocity than and in the same direction as the peripheral velocity of the adjacent second plurality of saws, for removing cotton and trash from said second plurality of saws, and
(f) an angle-plate positioned adjacent said doffer for deflecting trash thrown thereagainst from said doffer away from said doffer and for deflecting cotton thrown thereagainst from said doffer back against said doffer; a flexible brush, mounted adjacent said doffer, extending approximately tangentially of said doffer for flexing when trash is thrown thereagainst by said doffer and not flexing when cotton is thrown thereagainst by said doffer; and a second flexible brush, mounted adjacent said first plurality of saws, extending approximately tangentially of said first plurality of saws for lightly urging cotton and trash into contact with said first plurality of saws.

5. The apparatus set forth in claim 4, including: a third flexible brush, mounted adjacent said second plurality of saws, extending approximately tangentially of said second plurality of saws for lightly urging cotton and trash into contact with said second plurality of saws.

References Cited
UNITED STATES PATENTS

| | | | |
|---|---|---|---|
| 2,731,673 | 1/1956 | Wallace | 19—35 |
| 3,070,942 | 1/1963 | Mitchell et al. | 19—36 X |

DORSEY NEWTON, Primary Examiner